Patented Apr. 7, 1942

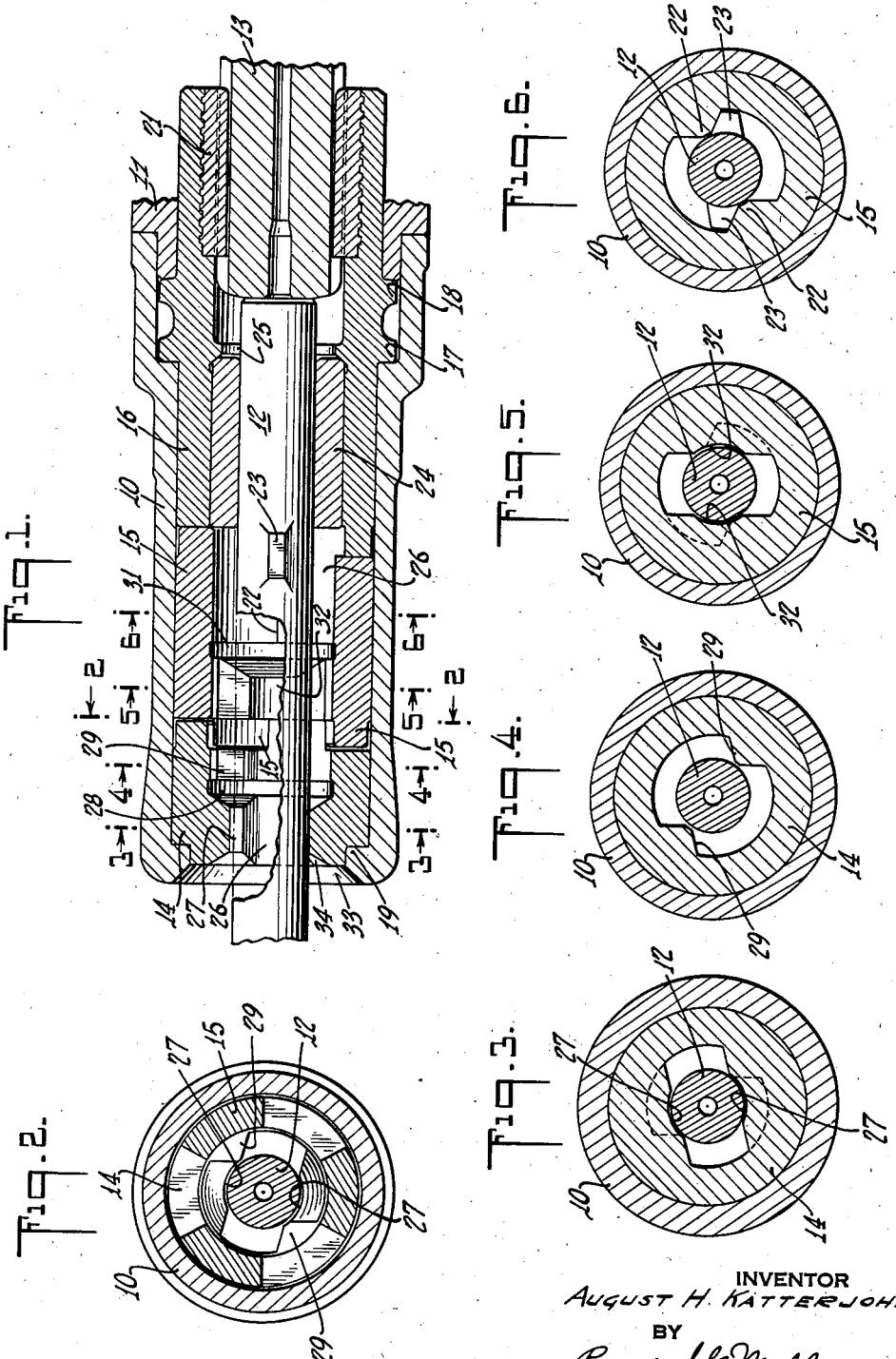

2,278,931

UNITED STATES PATENT OFFICE 2,278,931

DOUBLE LOCK CHUCK FOR ROCK DRILLS

August H. Katterjohn, Detroit, Mich., assignor to Chicago Pneumatic Tool Company, New York, N. Y., a corporation of New Jersey Application October 11, 1940, Serial No. 360,775

6 Claims. (Cl. 279—19.3)

This invention relates to a rotatable chuck mechanism capable of embodiment in a rock drill or like device and especially adapted to facilitate introduction of a lugged tool into the drill and to lock the tool therein.

One type of rock drill to which the invention is particularly adapted is the "drifter," characterized by a shell mount or fixed support provided with feeding means for moving the drill toward and from the work to advance and retract the working tool or steel through the rock. Feeding of the drill is usually accomplished automatically, and simultaneously with operation of the hammer piston thereof. When changing steels, in drifter work, there is an increasing tendency on the part of the operator to insert the new steel in the hole in the face of the rock and then advance the drill upon the shank of the steel with the drill in operation. By reason of the abrupt termination of its front end and the formation of its chuck bore, the conventional drill is not well adapted for this practice, and it is the general object of this invention to so modify the usual chuck mechanism as to increase its adaptibility in this respect.

More specifically, it is an object of the invention to permit easy insertion of the working tool into the drill while the chuck mechanism is rotating.

Another object of the invention is to obtain a long bearing for the tool in advance of the lugged portion thereof.

In modifying the conventional chuck mechanism there has been produced a rotatable cylindrical chuck assembly, having a longitudinal bore and an inwardly tapered mouth for guiding the lugged shank of a working tool into position within the bore, and having a plurality of spaced bearings and a plurality of spaced abutment lugs within the bore, the abutment lugs being engageable with the lugged portion of the tool to impart rotary movement to the tool.

Other objects and structural details of the invention will be more apparent from the following description when read in conjunction with the accompanying drawing, wherein:

Fig. 1 is a fragmentary view, in longitudinal section, showing the front end of a rock drill embodying the mechanism of the invention;

Fig. 2 is a cross sectional view taken along the line 2—2 of Fig. 1, and looking toward the front of the drill; and Figs. 3, 4, 5 and 6 are cross sectional views taken along the respective lines indicated in Fig. 1, and looking toward the rear of the drill.

The front end of a rock drill comprises, as shown in Fig. 1, a cylindrical housing extension 10 rigidly secured to the main supporting cylinder 11, and a rotatable chuck assembly positioned within the housing 10 and provided with a longitudinal bore adapted to receive the shank of a drill steel, or working tool, 12. When fully inserted in the drill, the inner end of the tool 12 lies in the path of a reciprocable hammer piston 13 and receives impacts therefrom during operation of the drill to drive the working end of the tool through the rock. The hammer piston 13 is slidably mounted within the main cylinder 11 and, in addition to its longitudinal pulsating movement, is given a step-by-step rotary movement, which movement is transmitted to the tool 12 through the chuck assembly.

Considering now the structural details of the chuck assembly, it will be seen to comprise a plurality of axially aligned tubular elements 14, 15 and 16 connected in the usual manner by interlocking jaws and thereby constrained to turn as a unit within the housing 10. Rearmost element 16 has a pair of annular ribs 17 and 18 on its outer periphery engageable respectively with an internal shoulder on the housing 10 and the front end of the cylinder 11 to prevent longitudinal movement of this element relative to the stationary supports. Front element 14 and intermediate element 15 are held against forward longitudinal movement by the engagement of element 14 with an inturned flange 19 at the front end of the housing 10. The chuck element 16 extends rearwardly into the main cylinder 11 and receives the front end of the hammer piston 13. A chuck nut 21 is threaded into the inner end of the element 16 and has a splined engagement with the hammer piston whereby the step-by-step movement of the piston is imparted to the element 16 and to the entire chuck assembly. In order that this movement may be transmitted to the working tool 12, the inner periphery of intermediate chuck element 15 is formed with a set of abutment portions or lugs 22 (see Fig. 6) which engage a pair of oppositely disposed lugs 23 on the tool and thereby drive the tool in unison with the chuck assembly. The lugs 23 are positioned forwardly of the rear end of the tool 12 and abut against the front end of a chuck bushing 24 to limit rearward movement of the tool. The chuck bushing 24 is pressed into the chuck element 16, in advance of an internal rib 25 therein, and acts as a bearing for that part of the tool 12 which lies rearwardly of the lugs 23.

As thus far described, the present front end construction does not differ materially from that of the conventional rock drill. The portion of the chuck assembly normally lying in front of the lugs 23 has been modified by this invention, however, to effect a generally new mode of cooperation between the assembly and the working tool. In describing the internal formation of the tubular elements 14 and 15 it may be said that there is provided therein a longitudinal bore 26 adapted to receive the shank of the tool 12, and having a plurality of grooves forming passageways and abutment chambers for the lugged portion of the tool. The plurality of grooves are longitudinally offset with respect to each other and overlap at their adjacent ends whereby spaced abutment lugs are formed at the overlapping sections of said grooves and spaced tool bearings are formed along the remaining length of the grooves. The several grooves are combined in a plurality of oppositely disposed pairs of grooves, each of which pairs will for convenience of description be termed a single groove. A first groove extends through the tubular element 14 and forms a pair of spaced bearings 27 (Figs. 1, 2 and 3) which provide a support and guide for the working tool at the very front of the chuck assembly. Offset from the first groove, and substantially vertical as viewed in Figs. 2–5, is a second groove the forward end of which terminates within the element 14 at an annular groove 28. Thus, between the annular groove 28 and the inner end of element 14, the adjacent ends of the first and second grooves overlap and form a set of abutment lugs 29 like the previously mentioned set of lugs 22. The said second groove extends rearwardly throughout the length of intermediate element 15 and there is also formed within element 15 a third groove having its forward end terminating in an annular groove 31. The groove 31 is located intermediate the opposite ends of element 15 so that between this groove and the front of the element a pair of spaced bearings 32 (Fig. 5) are formed. The said third groove is offset with respect to the second groove and the overlapping area between the groove 31 and the rear of element 15 is occupied only by the driving lugs 22.

There is thus formed along the longitudinal bore 26, within the elements 14 and 15, two spaced sets of tool bearings and two spaced sets of abutment lugs, the forward one of the sets of lugs lying between the two sets of bearings. This forward set of lugs is the set 29 and it is the function of these abutments to align the tool lugs 23 with the said second groove when inserting a tool into the drill. In effecting such insertion with the drill in operation, the drill is advanced relatively to the tool and when the lugs 23 enter the said first groove, in chuck element 14, the tool begins to rotate with the chuck assembly. When the front bearings 27 have advanced beyond the lugs 23 the rotary movement of the tool is interrupted and the chuck assembly turns relatively to the tool to place the first groove out of alignment with the lugs 23 and bring the abutment portions 29 into engagement with the lugs. The tool now begins again to rotate with the chuck assembly and such engagement serves also to align the lugs 23 with the said second groove. As the drill continues to advance the bearings 32 pass the lugs 23 and rotary movement of the tool is again interrupted while the said second groove moves out of alignment with the lugs 23 and the driving abutment portions 22 move into engagement with the lugs. The tool finally assumes the position shown in Fig. 1 and is carried with the chuck assembly during its subsequent rotation and longitudinal advancement. When the tool is fully inserted in the drill the lugs 23 stand out of alignment with both the first and second grooves and the tool is thereby doubly locked against accidental removal.

In order further to simplify entering the tool 12 into the drill the front end of the housing 10 and front end of the chuck assembly are formed with respective inwardly tapering surfaces 33 and 34 (Fig. 1) which guide the shank of the tool into position within the longitudinal bore 26.

The term "chuck assembly" as used in the claims should not be limited in its interpretation to the particular arrangement shown, in which a plurality of tubular elements are interlocked for rotation as a unit. This construction represents merely a manufacturing expedient since the invention might also be embodied in a one piece chuck.

What is claimed is:

1. A chuck mechanism for lugged tools, comprising a rotatable cylindrical chuck assembly through which the shank of a lugged tool may be passed, front and rear bearings for the tool formed on the inner periphery of said assembly and spaced longitudinally from each other, and separate sets of abutment lugs on the inner periphery of said assembly and cooperable with the lugged portion of a tool to impart rotation to the tool, said separate sets of lugs being formed on opposite sides of said rear bearing and longitudinally offset with respect to each other.

2. A chuck mechanism for lugged tools, comprising a rotatable cylindrical chuck assembly through which the shank of a lugged tool may be passed, a set of spaced bearings for said tool formed on the inner periphery of said assembly, and separate sets of spaced lugs formed on the inner periphery of said assembly and cooperable with the lugged portion of a tool to impart rotation to the tool, said separate sets of lugs being formed on opposite sides of said set of bearings and longitudinally offset with respect to each other.

3. A chuck mechanism for lugged tools comprising a rotatable cylindrical chuck assembly through which the shank of a lugged tool may be passed, a first tool bearing within said assembly adjacent the front end thereof, a first set of abutment lugs within said assembly and cooperable with the lugged portion of a tool to impart rotation to the tool, said first set of lugs being positioned rearwardly of said first bearing, a second tool bearing within said assembly and positioned rearwardly of said first set of lugs, and a second set of abutment lugs within said assembly and positioned rearwardly of said second bearing.

4. In a rock drill or like device, the combination of a cylindrical housing into which a lugged tool may be inserted, a chuck assembly rotatably mounted in said housing and comprising a plurality of interlocked tubular sleeves providing a single longitudinal bore through which the shank of a lugged tool may be passed, a bushing pressed into the rear end of said longitudinal bore and adapted to receive the inner end of the tool with a sliding fit, first and second tool bearings formed within said longitudinal bore at spaced positions in advance of said bushing, and first and second sets of abutment lugs within said longitudinal bore and cooperable with the lugged portion of a tool to impart rotation to the tool, said sets of abutment lugs being longitudinally spaced from one another and thereby adapted successively to engage the lugged portion of a tool as the tool is inserted in the chuck assembly.

5. A chuck mechanism for lugged tools, comprising a rotatable chuck assembly, a longitudinal bore in said assembly for the reception of a lugged tool, and a plurality of longitudinal grooves in said bore cooperating to form within said assembly a series of projections defining: front and rear sets of spaced tool bearings, and front and rear sets of abutment lugs cooperable with the lugged portion of a tool to impart rotation to the tool, the said front set of lugs being positioned between said front and rear sets of bearings, and the said rear set of lugs being positioned rearwardly of both said sets of bearings.

6. A chuck mechanism for lugged tools, comprising a rotatable cylindrical chuck assembly, a longitudinal bore in said assembly adapted to receive the shank of a lugged tool with a sliding fit, and a plurality of rearwardly extending longitudinal grooves in said bore permitting the passage of the lugged portion of a tool therethrough, said grooves including a first groove opening through the front end of the chuck assembly, a second groove having its front end terminating ahead of the rear end of said first groove and short of the front end of the assembly, said first and second grooves being offset with respect to each other thereby to form a set of abutment lugs for engagement with the lugged portion of the tool, and a third groove having its front end terminating between the front and rear ends of said second groove and rearwardly of said first groove, said second and third grooves being offset with respect to each other to form another set of abutment lugs rearwardly of the first said set.

AUGUST H. KATTERJOHN.